United States Patent
Lin et al.

(10) Patent No.: US 9,330,460 B2
(45) Date of Patent: May 3, 2016

(54) TREATMENT RECOMMENDING SYSTEM OF PLANT SYMPTOMS, METHOD AND NON-TRANSITORY COMPUTER-READABLE MEDIUM

(71) Applicant: Institute for Information Industry, Taipei (TW)

(72) Inventors: Ming-Cheng Lin, Kaohsiung (TW); Po-Cheng Huang, Sihu Township, Yunlin County (TW); Mao-Yuan Chin, Pingtung (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 170 days.

(21) Appl. No.: 14/095,212

(22) Filed: Dec. 3, 2013

(65) Prior Publication Data

US 2015/0131867 A1    May 14, 2015

(30) Foreign Application Priority Data

Nov. 8, 2013   (TW) .............................. 102140673 A (51) Int. Cl.
*G06T 7/00*   (2006.01)

(52) U.S. Cl.
CPC ..... *G06T 7/0014* (2013.01); *G06T 2207/10024* (2013.01); *G06T 2207/30188* (2013.01)

(58) Field of Classification Search
None
See application file for complete search history.

(56) References Cited

U.S. PATENT DOCUMENTS

| 6,014,451 A * | 1/2000 | Berry et al. ................. 382/110 |
| 2004/0147840 A1* | 7/2004 | Duggirala ............... A61B 8/00 600/437 |
| 2012/0008838 A1* | 1/2012 | Guyon et al. ................. 382/128 |
| 2012/0046837 A1* | 2/2012 | Anderson ..................... 701/50 |
| 2012/0114187 A1 | 5/2012 | Duarte |
| 2013/0136312 A1* | 5/2013 | Tseng et al. ................. 382/110 |
| 2014/0036054 A1* | 2/2014 | Zouridakis ..................... 348/77 |

FOREIGN PATENT DOCUMENTS

| CN | 101695128 A | 4/2010 |
| TW | M438000 | 9/2012 |

OTHER PUBLICATIONS

Gulhane et al. "Detection of Diseases on Cotton Leaves and its Possible Diagnosis," published in the International Journal of Image Processing (IJIP), vol. (5) : Issue (5) : 2011.*

(Continued)

*Primary Examiner* — Vu Le
*Assistant Examiner* — Alexander J Lesnick
(74) *Attorney, Agent, or Firm* — Muncy, Geissler, Olds & Lowe, P.C.

(57) ABSTRACT

A treatment recommending system of plant symptom includes an operation interface, an image capture unit, a processing unit and a storage unit for storing plant symptom data and diagnostic data. The processing unit may find target contour data presenting a plant part according to symptom description and symptom characteristic data. The image capture unit obtains plant image data corresponding to the target contour data. The processing unit analyzes the plant image data, and coordinates with the symptom characteristic data to determine corresponding treatment recommendation data.

16 Claims, 5 Drawing Sheets

(56) References Cited

OTHER PUBLICATIONS

Camargo et al. "An image-processing based algorithm to automatically identify plant disease visual symptoms," published in Biosystems Engineering 102 (2009), p. 9-21.*

Tian, You-Wen et al., Color image segementation method based on statistical pattern recognition for plant disease diagnose, Journal of Jilin University (Engineering and Technology Edition), Apr. 2004, pp. 291-293, vol. 34.

* cited by examiner

TREATMENT RECOMMENDING SYSTEM OF PLANT SYMPTOMS, METHOD AND NON-TRANSITORY COMPUTER-READABLE MEDIUM

CROSS-REFERENCE TO RELATED APPLICATION

This application claims the benefit of Taiwan Patent Application No. 102140673, filed on Nov. 8, 2013, which is hereby incorporated by reference for all purposes as if fully set forth herein.

BACKGROUND

1. Field of the Invention

The present invention relates to a treatment recommending system of plant symptom, a method and a non-transitory computer-readable medium, and more particularly to a treatment recommending system of plant symptom, a method and a non-transitory computer-readable medium providing treatment schemes according to plant symptoms.

2. Related Art

In the prior art, pests and diseases often occur in the process of planting plants, or some symptoms are generated, gardening staffs or farmers may not know how to deal with, or be unsure whether the plant condition is normal, the measures taken are mostly to capture disease parts of the plant or the whole plant to the pesticide shop, the Agriculture Appliance Industry or the Agriculture-related Research Unit for judgment, to follow the treatment provided by agricultural experts. On the other hand, to save the consultation cost, sometimes people may find plant disease data and coping treatment data by network resources or relevant documents.

However, the personnel in the pesticide shop, the Agriculture Appliance Industry or the Agriculture-related Research Unit mostly provides recommended coping polices based on experience, that is, the so-called rule of thumb, and such an approach must rely on the personnel's treatment, which is time-consuming. If gardening staffs or farmers find a solution by themselves, it is not easy to obtain correct coping treatment data, and if gardening staffs or farmers lack of proper judgment, and feel difficult to judge whether the symptoms of the plants they plant are completely the same as the symptoms they have found, and treatment recommendation data that completely meets requirements cannot be directly obtained, which easily leads to problems of agricultural hazards.

SUMMARY

In view of this, to solve the foregoing problems, the present invention provides a treatment recommending system of plant symptom, a method and a non-transitory computer-readable medium providing coping treatment according to plant symptoms.

The treatment recommending system of plant symptom according to the present invention includes an operation interface, a storage unit, an image capture unit and a processing unit.

The operation interface is used for receiving symptom description data. The storage unit stores at least one plant symptom data and at least one diagnostic data, wherein each plant symptom data includes symptom characteristic data and display contour data corresponding thereto, and each diagnostic data includes diagnostic characteristic data and treatment recommendation data corresponding thereto. The processing unit connects the operation interface and the storage unit, and determines corresponding target contour data from the display contour data according to the symptom description data received and the symptom characteristic data. The target contour data is used for presenting an outer contour image of a part of a plant. The image capture unit connects the processing unit, receives and displays the target contour data, and obtains plant image data corresponding to the target contour data. The processing unit receives and analyzes the plant image data to generate plant analysis data, and determines corresponding treatment recommendation data according to the plant analysis data and the diagnostic characteristic data.

The treatment recommending method of plant symptom according to the present invention includes: providing a storage unit for storing at least one plant symptom data and at least one diagnostic data, wherein each plant symptom data includes symptom characteristic data and display contour data corresponding thereto, and each diagnostic data includes diagnostic characteristic data and treatment recommendation data corresponding thereto; receiving symptom description data via an operation interface; determining corresponding target contour data from the display contour data according to the symptom description data received and the symptom characteristic data via a processing unit, wherein the target contour data is used for presenting an outer contour image of a part of a plant; obtaining plant image data corresponding to the target contour data via an image capture unit; and analyzing the plant image data via the processing unit to generate plant analysis data, and determining corresponding treatment recommendation data according to the plant analysis data and the diagnostic characteristic data.

The present invention further provides a non-transitory computer-readable medium of a treatment recommending method of plant symptom, wherein the treatment recommending method of plant symptom includes: providing a storage unit for storing at least one plant symptom data and at least one diagnostic data, wherein each plant symptom data includes symptom characteristic data and display contour data corresponding thereto, and each diagnostic data includes diagnostic characteristic data and treatment recommendation data corresponding thereto; receiving symptom description data via an operation interface; determining corresponding target contour data from the display contour data according to the symptom description data received and the symptom characteristic data via a processing unit, wherein the target contour data is used for presenting an outer contour image of a part of a plant; obtaining plant image data corresponding to the target contour data via an image capture unit; and analyzing the plant image data via the processing unit to generate plant analysis data, and determining corresponding treatment recommendation data according to the plant analysis data and the diagnostic characteristic data.

The treatment recommending system of plant symptom, the method and the non-transitory computer-readable medium according to the present invention can provide appropriate plant image contour data, for gardening staffs or farmers to photograph proper plant symptom parts, and identify plant symptoms according to images, which can significantly improve identification accuracy and provide more appropriate treatment recommendations to the users, so as to decrease dangers brought by pesticides or incorrect plant syndrome treatment. Secondly, the system could be combined with a portable electronic device having a photographing function to photograph plant appearance for appearance characteristic analysis, and/or through comparison of appearance characteristic data, judgment results and recommended treatment schemes could be obtained more quickly, which saves the cost of consulting and finding solutions such as plant symptoms and treatment policies themselves, thus having higher applicability and convenience.

DETAILED DESCRIPTION

Preferred embodiments of the present creation are further described below with reference to the drawings.

Figure 1:
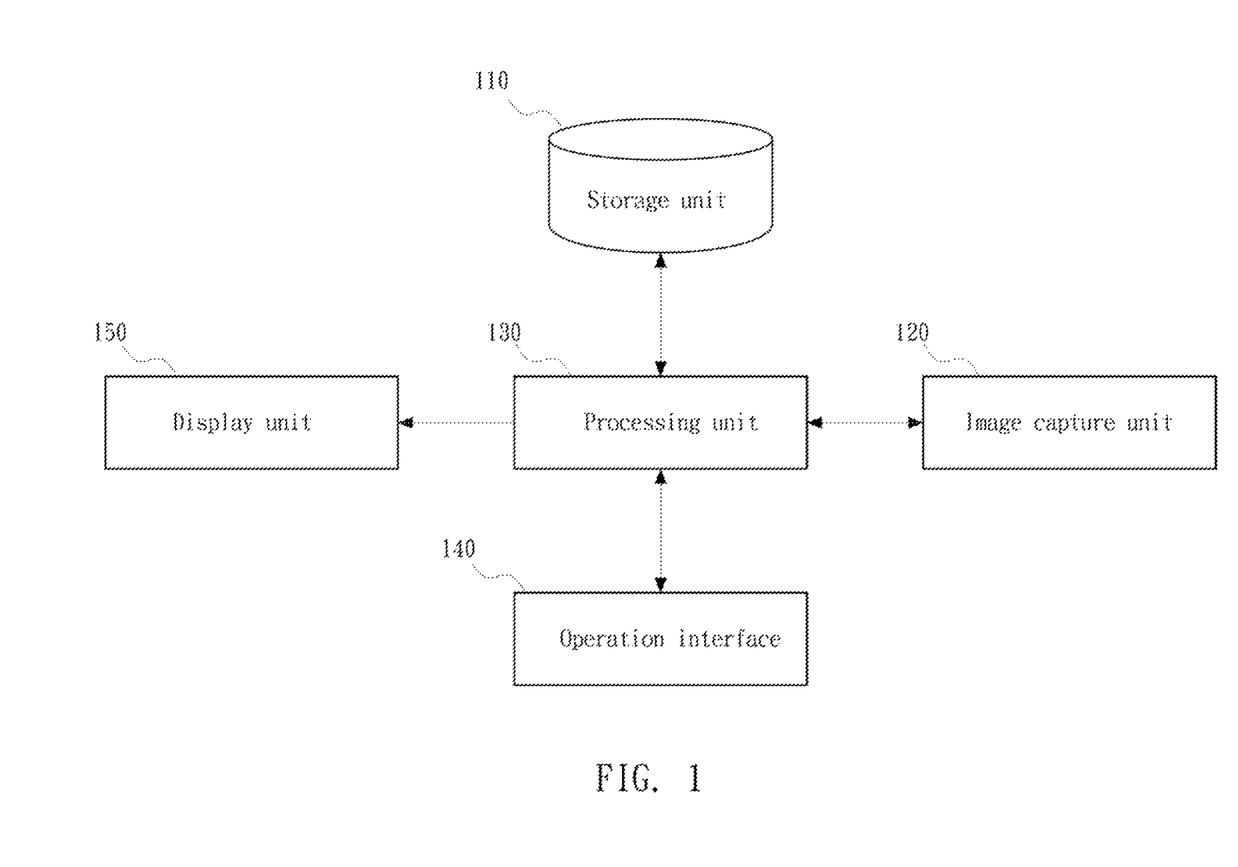
FIG. 1 illustrates a block diagram of a treatment recommending system of plant symptom according to an embodiment of the present invention.

FIG. 1 illustrates a block diagram of a treatment recommending system of plant symptom according to an embodiment of the present invention. The system in this embodiment is applicable to an electronic device, but is not limited thereto. In other embodiments, the electronic device also may be a personal computer, a notebook computer, Kiosk, a Smart Phone, a Personal Digital Assistance (PDA) or a Tablet PC. Alternatively, the system in this embodiment is applicable to a system environment formed by more than two electronic devices in a wired or wireless connection, for example, a combination of a digital camera with an image capture function and a personal computer.

The system at least includes an operation interface 140, a storage unit 110, a processing unit 130 and an image capture unit 120. The processing unit 130 connects to the operation interface 140, the storage unit 110 and the image capture unit 120. The storage unit 110 stores more than one plant symptom data and diagnostic data.

In some embodiments, each plant symptom data includes symptom characteristic data and display contour data corresponding thereto. The plant symptom data at least includes a variety of plant data such as plant species, parts, appearance characteristics, growth conditions, and disease aspects. The plant symptom data can be received and inputted via the operation interface 140. The symptom characteristic data records various symptoms of plants such as abnormal parts, diseases, abnormal growth, and changes in appearance, for example, abnormal plant characteristics such as white spot, etiolation, wilt, insect biting mark, and mold etc. The display contour data is corresponding data of the symptom characteristic data, and at least includes plant symptom change parts (e.g., roots, stems, leaves, flowers, fruits, seeds, plant cuticle), appearance, contour, curve, color and image data possibly presenting shapes, which may be more than one image data type such as photos, graphics, and sketches.

Each diagnostic data includes diagnostic characteristic data and treatment recommendation data corresponding thereto. The diagnostic characteristic data refers to judgment conditions corresponding to plant abnormalities obtained after directly analysis on the plant or images captured by photographing the plants, such conditions may be text data describing plant abnormalities, or media images used for judging plant abnormalities, and in some embodiments, image analysis conditions such as image color, appearance, shape, contour, and plant part curves are further combined. The treatment recommendation data records data such as plant disposal manners corresponding to the diagnostic characteristic data (e.g., soil replacement, supply/drainage adjustment, environmental condition adjustment, grafting, adjustment fertilization), treatment schemes (pruning, peeling, drug, training), therapeutic agents (e.g., medicament name and kind, such as micro-emulsions, suspensions, emulsions), drug instructions (such as drug ratio, dosage, dilutions, other mixture species and mixture capacity, and safety harvest days), trace elements (such as nitrogen, phosphorus, potassium, boron, calcium), scheme execution time, operation manners, situations possibly occurring in plants and their environments during disposal, and relevant important notes.

The operation interface 140 is available for a user to input or connect to a storage unit/data source, so as to input the above plant symptom data to the system or send an operation instruction to the system.

In some embodiments, the user can use the operation interface 140 to input more than one symptom description data, for example, the operation interface 140 may provide some options (such as plant species or possible symptom description) for the user to select, or provide an input field for inputting symptom-related characteristic texts. The symptom description data may include more than one text or graphical description data related to plant abnormal symptoms such as plant part data to be analyzed, plant abnormality description, and plant growth environment description. Alternatively, the processing unit 130 may read various plant symptom data from the storage unit 110, and present graphical or text data to a display unit 150 by means of question-and-answer or menu selection for the user to understand, and input or select the symptom description data through the operation interface 140.

The processing unit 130 may be various processors having data computing capability (Central Processing Unit, Micro Processing Unit, Micro Computing Unit), Computing Chips or a combined circuit of the foregoing elements, other element combination types having relevant functions and types such as integrated circuits (ICs) or electronic devices with equivalent capability are also applied, which is not limited thereto. In other embodiments, the processing unit 130 may be replaced by ordinary electronic devices, such as computers, mobile devices, or PDA.

The processing unit 130 may perform data matching when obtaining the symptom description data and the symptom characteristic data, so as to determine target contour data corresponding to the matching result from all display contour data. The target contour data is used for presenting an outer contour image of a part of a plant.

In some embodiments, the processing unit 130 may have more than one matching result when matching the symptom description data and the symptom characteristic data. When there is a plurality of matching results, the processing unit 130 may present outer contour images corresponding to the matching results on the display unit 150, for the users to make reference to and use the operation interface 140 to select. The processing unit 130 then selects a target contour image according to input data of the operation interface 140.

The image capture unit 120 may connect to the processing unit 130 via a communication network or a serial port. The image capture unit 120 may be a digital camera, a digital video camera or other devices having an image capture function (such as mobile phones or tablet computers having a photographing function), or an analog image capture device and analog/digital, but it is not limited thereto, as long as a photographing device will do. The image capture unit 120 is used for photographing the whole or part of positions of the plant, wherein the photographed parts include abnormal plant parts or parts on which image analysis is to be performed.

The image capture unit 120 may obtain and present the target contour data, for the target contour to photograph images of the plant, and obtain plant image data corresponding to the target contour data. The plant image data may be image data including the whole or part of the plant or mostly including affected plant parts, depending on the symptom description data. For example, when the symptom description data is a disease occurs in leaves of Plant A, and symptom characteristic data of Plant A, the leaf thereof, the corresponding display contour data of Plant A and the leaf thereof may be found from the plant symptom data stored in the storage unit 110, to serve as the target contour data.

The processing unit 130 may analyze the plant image data photographed according to the target contour data to generate plant analysis data, and determine corresponding treatment recommendation data according to the plant analysis data and the symptom characteristic data. The image diagnosis of the prior art often captures images of the whole plant, or photographs close-up images of parts of the plants, but as the whole plant image and the partial close-up image include a consideration number of contents (for example, roots, stems, flowers where no symptoms exist, or aiming to target leaves, but some unnecessary leaves are included), it is not easy to find symptom region image data (i.e., main part of the syndrome) from the image during analysis of the plant image data, and thus accuracy of analysis and diagnosis is poor. As the plant image data captured according to the target contour data is mainly captured with respect to regions where the symptoms are, so as to be used for plant image analysis and diagnosis, it is more accurate than photographing the whole plant.

In some embodiments, when analyzing the plant image data, the processing unit 130 may use various image identification technologies at present to analyze disease analysis types and disease ranges. It may be generally commercially available image analysis software, or the conventional image characteristic identification method, which uses treatments in the digital image treatment and reference data algorithms, to obtain the plant height, main stem length, width, the number of leaves, leaf area and other plant characteristic values, including background separation (grayscale), characteristic identification, image correction, etc. In some embodiments, a two-stage chromatism process may be used for analysis.

For instance, the processing unit 130 may use a first chromatism process to analyze the plant image data to obtain plant part image data, analyze the plant part image data according to a second chromatism process to obtain at least one symptom region image data, and then use the symptom characteristic data in the storage unit 110 to analyze symptom region image data.

The first chromatism process mainly converts RGB data of the plant image data into tones, pre-defines a tone interval of the plant image to be taken out, and then removes a portion from the plant image data whose chromatism data is consistent with the plant image tone interval to serve as the plant part image data. The plant image data per se (e.g., leaves, petals, roots, stems) usually has particular color, shape and contour, and the color has the features of being concentrated on a specific tone interval after the color was converted into a tone, and outer shape and round lines of the plant can be found through the tone concentration of the color; thus, removing the plant part image data by using such features in the present invention is also applicable to the automatic identification technology in identifying plant parts.

However, the tone may use common definition of general industries, for example, the YUV tone value, which is a formula formulated and used in general industries, to convert the RGB value into the YUV tone value (brightness, chromaticity, concentration). In the present invention, the tone may define a more-than-one-dimensional tone value (such as brightness, chromaticity, concentration, grayscale, color, luminance and contrast) according to features of the plant image data and the conversion formulas between it and the RGB value. Generally speaking, higher dimension will have higher accuracy, but the time for conversion will be more; the lower dimension will have lower the accuracy, but the time for conversion will be less. In some embodiments, preferably, the tone dimension is 2-3 dimensions.

To avoid that the plant image data has unnecessary backgrounds similar to the plant images, the step that processing unit 130 analyzes the plant image data according to a first chromatism process to obtain the plant image data may, first split the plant image data into plant foreground image data and plant background image data according to a luminance analysis technology, and then analyze the plant foreground image data according to the first chromatism process to obtain the plant image data. The luminance analysis technology is to obtain RGB data corresponding to the plant image data according to the plant image data, convert the plant image data into a grayscale plant image according to the RGB data of the plant image data, and perform binary image arithmetic processing according to the grayscale plant image, to obtain plant foreground image data and plant background image data of the plant image data.

In the foregoing embodiment, a binary image arithmetic process can be used to separate a plant foreground image and a plant background image. The binary image arithmetic process is also called gray division (Threshold) image process, which mainly sets a gray value, where the gray value of the image per se is greater than the set gray value, the image is made as a bright spot, where the gray value is lower than the set value, the image is made as a dark spot, so as to get a binary image.

The second chromatism process defines at least one disease tone interval, and then removes a portion consistent with the at least one disease tone interval from the plant image data to serve as at least one suspected disease region image data.

The principle of the second chromatism process is the same as that of the first chromatism process, and since disease images in the plant image may often have a particular tone interval or significantly differ from the plant image tone interval, the present invention uses the feature to find out suspected disease region image data from the plant image.

The second chromatism process may define more than one disease tone intervals, and then remove images consistent with the disease tone intervals from the plant image data to serve as suspected disease region image data. The suspected disease region image data may be one or more. Different diseases may have the same or different disease tone intervals, and the second chromatism process may find images consistent with a particular disease tone interval with respect to the particular disease tone interval.

In other embodiments, the second chromatism process also may take tone intervals other than the plant image tone intervals as the disease tone intervals.

In addition, the first chromatism process and the second chromatism process above may be the same or different tone processing technologies. When the first chromatism process and the second chromatism process are the same chromatism process, they can be defined with the plant image tone intervals and multiple disease tone intervals respectively.

In other embodiments, after obtaining the plant part image data, the processing unit 130 may remove noise of the plant part image data, and analyze the plant part image data whose noise has been removed according to the second chromatism process, to obtain the symptom region image data. In some embodiments, the processing unit 130 may compare a suspected disease region with an area threshold, and once the area of the suspected disease region is not greater than the area threshold, the image part in the suspected disease region may be regarded as the noise in the plant part image data.

In some embodiments, when the processing unit 130 determines corresponding treatment recommendation data according to the plant analysis data and the diagnostic characteristic data, the processing unit 130 may analyze single plant analysis data with multiple diagnostic characteristic data, and give different similarity proportion values according to similarity degree of the plant analysis data and each diagnostic characteristic data, so as to find the diagnostic characteristic data most similar to the plant analysis data from all diagnostic characteristic data, remove treatment recommendation data corresponding to the diagnostic characteristic data having the highest similarity degree, and provide it for the users to make reference to according to recommendation data of a combination of more than one of text, image, sound and continuous images through the display unit 150.

In other embodiments, the processing unit 130 may compare a similarity proportion value with a threshold, obtain all diagnostic characteristic data of the similarity proportion value exceeding the threshold, and provide treatment recommendation data corresponding to such diagnostic characteristic data for the users to make reference to.

In some embodiments, the treatment recommendation data is target drug data, and a recommended drug value and drug safety days corresponding to the target drug data. The processing unit 130 may output it to the display unit 150 for presentation according to such data. That is to say, when the treatment recommendation data is to recommend using a target drug, it further includes recommending using the application manner of the target drug, for example, how to dilute the drug or how much the application dosage is, and safe application days. However, in other embodiments, according to factors inputted by users such as plant growth environment, land area, charging container size and plant type, the processing unit 130 may coordinate with the treatment recommendation data to calculate dosage required by the users in addition, the target drug data provided by the processing unit 130 may be more than one types, that is to say, it is likely that multiple drugs are suitable to use, and the processing unit 130 may output all appropriate target drug data to the relevant display unit 150 for presentation.

In some embodiments, the treatment recommendation data may be data providing a plant specimen for a specified test. For example, reminding the users to prepare necessary test equipment or drugs to perform sampling or test the plant according to the manner of the treatment recommendation data. In other embodiments, the data for a specified test also may be recommending a location for the specified test, test time, data the user should complete and the plant test body, and it may further include description data of the test process.

In some embodiments, the treatment recommendation data is disease prevention data. For example, when the diagnostic data is that tomatoes get tomato toxin diseases (leafroll disease), the treatment recommendation data may be recommendations of increasing mosquito nets around the field, to reduce silverleaf whitetly damage or sprayed drug dose. Also, when the diagnostic data shows that leafy foliages are bitten by insects, the treatment recommendation data includes recommendations of applying insect-attracting boxes around the plant or spraying drugs.

In some embodiments, the storage unit 110 includes harvest time data of one or more plants. The processing unit 130 may combine the treatment recommendation data with the harvest time, to make out operations at various stages of the treatment recommendation data. In other embodiments, the processing unit 130 may exclude the treatment recommendation data with the operation demand time less than the plant harvest time. However, the starting date of the operation demand time may start from the date on which the user uses the operation interface 140 or the processing unit 130 to intercepts. For example, if the treatment recommendation data includes sprayed drug A, a condition that the plant can be harvested only after a spray of 15 days is attached to the sprayed drug A, and thus the processing unit 130 may incorporate the condition into the treatment recommendation data. Alternatively, the user may specify a harvest date via the operation interface, and when the attached condition is inconsistent with the harvest date, the processing unit 130 may exclude the treatment recommendation data.

In some embodiments, the user may use the operation interface 140 to input planting-related data, such as planting area, planting start date, planting days, and planted plant species, and the processing unit 130 may perform operation condition calculation and data presentation of the treatment recommendation data according to the input data. The planting-related data of the storage unit 110 may be prestored and/or continuously updated.

In some embodiments, when the processing unit 130 presents multiple treatment recommendation data through the display unit 150 and the operation interface 140, the user can use the operation interface 140 to select one of the multiple treatment recommendation data, and then the processing unit 130 presents the selected treatment recommendation data through the display unit 150.

Figure 2:
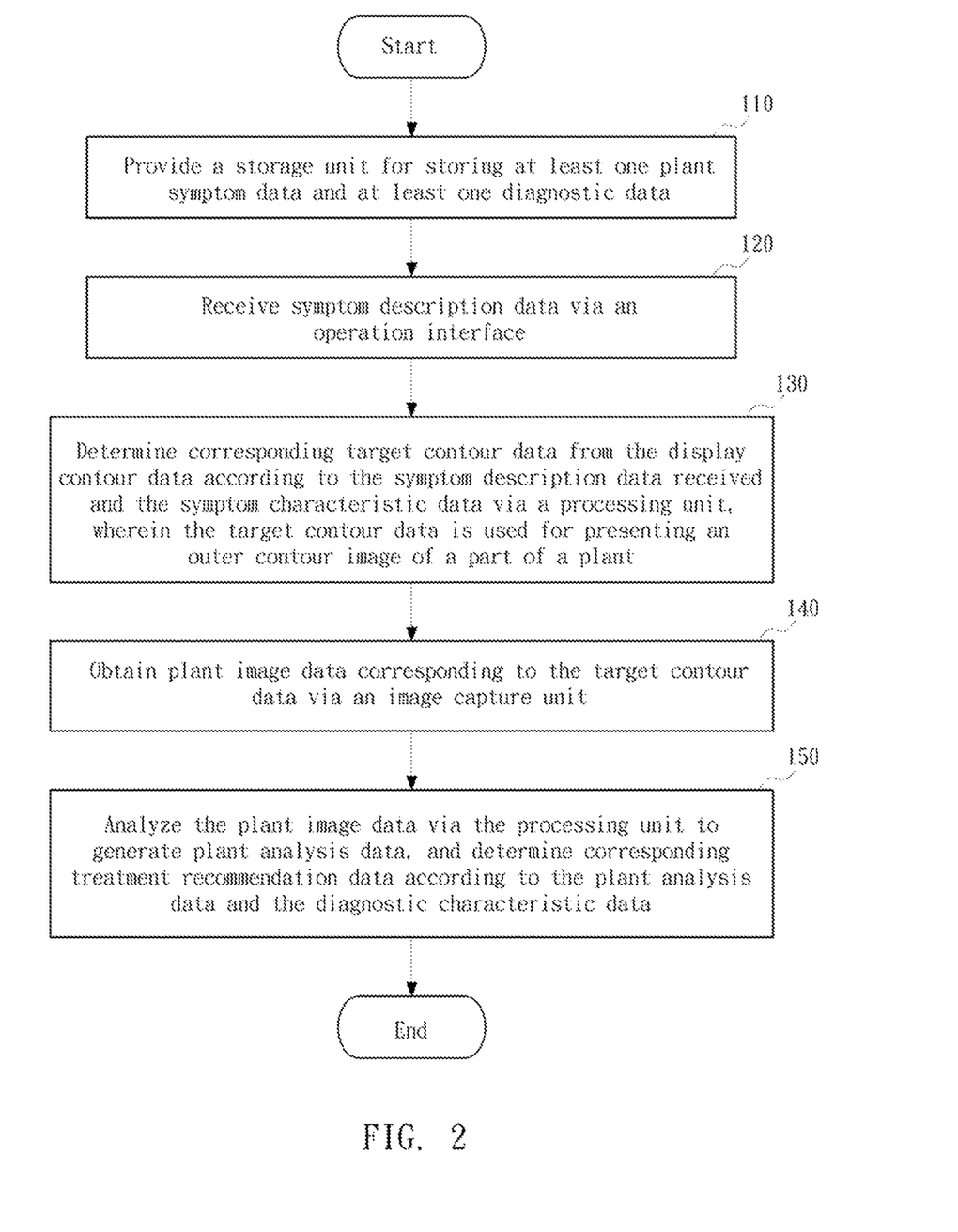
FIG. 2 illustrates a flow chart of a treatment recommending method of plant symptom according to an embodiment of the present invention.

FIG. 2 illustrates a flow chart of a treatment recommending method of plant symptom according to an embodiment of the present invention; please refer to FIG. 1 for ease of understanding. The method is applied to a treatment recommending system of plant symptom, and the system at least includes an operation interface 140, a storage unit 110, a processing unit 130 and an image capture unit 120. The method at least includes the following steps.

Provide a storage unit 110 for storing at least one plant symptom data and at least one diagnostic data (step S110). Each plant symptom data includes symptom characteristic data and display contour data corresponding thereto, and each diagnostic data includes diagnostic characteristic data and treatment recommendation data corresponding thereto.

Receive symptom description data via an operation interface 140 (step S120). The symptom description data includes more than one text or graphical description data related to plant abnormal symptoms such as plant part data to be analyzed, plant abnormality description, and plant growth environment description.

Determine corresponding target contour data from the display contour data according to the symptom description data received and the symptom characteristic data via a processing unit 130, wherein the target contour data is used for presenting an outer contour image of a part of a plant (step S130). The processing unit 130 may present outer contour images corresponding to matching results to a display unit 150, for users to make reference to and use the operation interface 140 for selection. Then, the processing unit 130 selects a target contour image according to the input date of the operation interface 140.

Obtain plant image data corresponding to the target contour data via an image capture unit 120 (step S140). The plant image data may be image data including the whole or part of the plant or mostly including affected plant parts.

Analyze the plant image data via the processing unit 130 to generate plant analysis data, and determine corresponding treatment recommendation data according to the plant analysis data and the diagnostic characteristic data (step S150).

When analyzing the plant image data, the processing unit 130 may use various image identification technologies at present to analyze disease analysis types and disease ranges. In some embodiments, the processing unit 130 may use two identical or different tone processing technologies to analyze the plant image data, so as to obtain plant part image data from the plant image data and obtain symptom region image data from the plant part image data, and use the symptom characteristic data in the storage unit 110 to analyze the symptom region image data.

Further, after obtaining the plant part image data, the processing unit 130 may remove noise of the plant part image data, and analyze the plant part image data whose noise has been removed to obtain the symptom region image data.

In some embodiments, the treatment recommendation data may be various different types. (1) The treatment recommendation data is target drug data, and a recommended drug value and drug safety days corresponding to the target drug data; (2) the treatment recommendation data is data providing a plant specimen for a specified test; (3) the treatment recommendation data is disease prevention data.

In other embodiments, the processing unit 130 may analyze single plant analysis data with multiple diagnostic characteristic data, and give different similarity proportion values according to similarity degree of the plant analysis data and each diagnostic characteristic data, so as to find the diagnostic characteristic data most similar to the plant analysis data from all diagnostic characteristic data, or the processing unit 130 may compare a similarity proportion value with a threshold, obtain all diagnostic characteristic data of the similarity proportion value exceeding the threshold, and provide treatment recommendation data corresponding to such diagnostic characteristic data for the users to make reference to.

Figure 3:
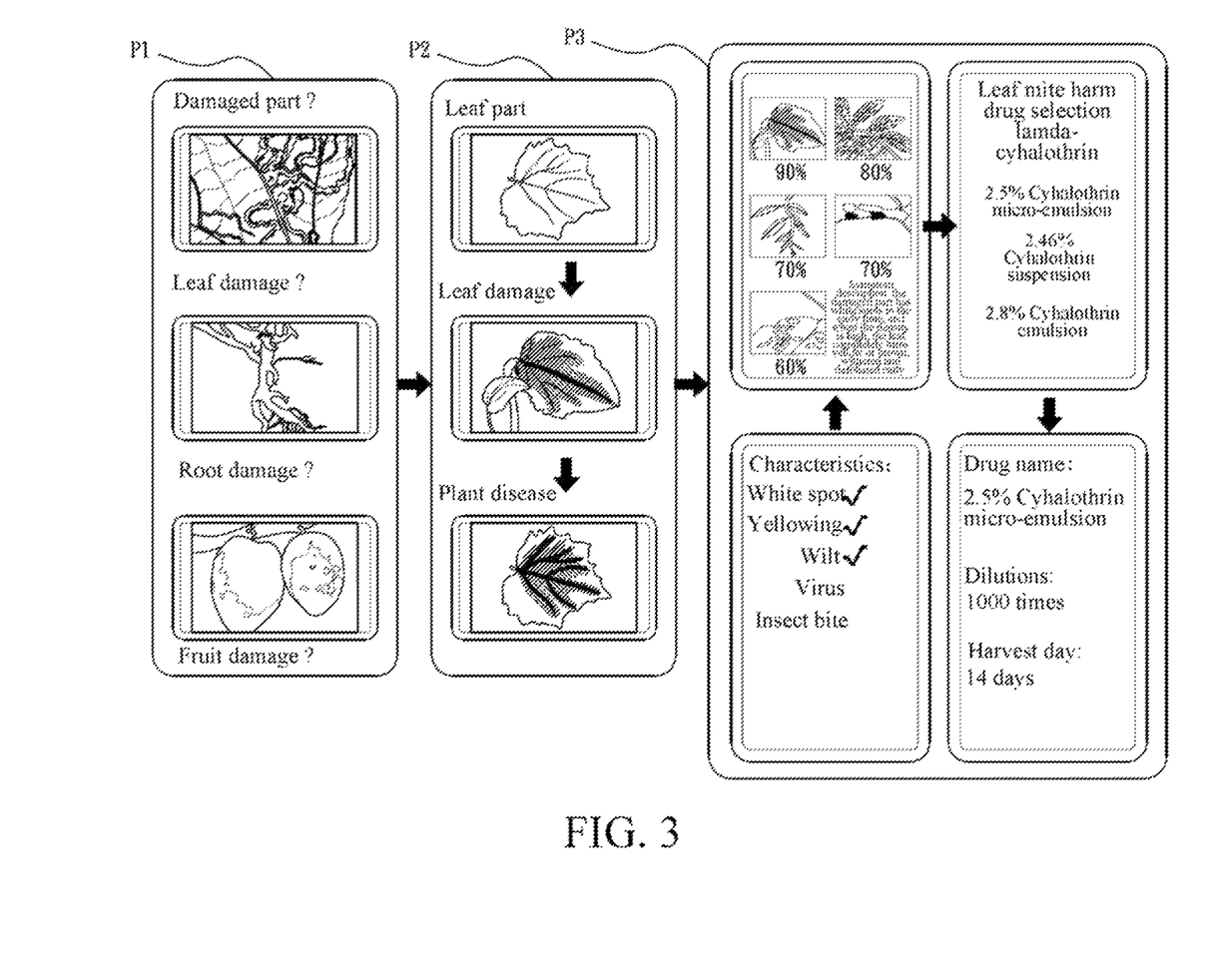
FIG. 3 illustrates a diagram of identification of plant symptom images according to an embodiment of the present invention.

FIG. 3 illustrates a diagram of identification of plant symptom images according to an embodiment of the present invention; please refer to FIG. 1 and FIG. 2 for ease of understanding. In this embodiment, the user can use the operation interface 140 to input more than one symptom description data. The symptom description data includes more than one text or graphical description data related to plant abnormal symptoms such as plant part data to be analyzed, plant abnormality description, and plant growth environment description.

For example, various different plant parts such as leaves, roots and fruits are shown in P1 stage. In some embodiments, the user can use the operation interface 140 to input or draw the plant part data to be analyzed by depicting lines, or the processing unit 130 lists multiple symptom data to the display unit 150, for the user to select by the operation interface 140.

In this embodiment, for example, as shown in P2 stage, the processing unit 130 judges that the leaf part is the part to be selected for analysis, that is, plant part image data of the leaf part is set up. Next, the processing unit 130 may analyze the plant part image data and the leaf damage range in the plant part image data, regard it as suspected disease region image data with higher disease possibility, and then use symptom characteristic data to analyze the suspected disease region image data. When the processing unit 130 finds the relevant symptom characteristic data, it removes particular disease data where such symptom characteristic data belongs.

In this embodiment, for example, as shown in P3 stage, the processing unit 130 judges that the diagnostic data consistent with the plant abnormality is a disease-type plant disease, and one or more possible diagnostic characteristic data exists. The processing unit 130 may output possibility of establishment of each diagnostic characteristic data for the user to make selection. Next, the processing unit 130 may provide corresponding treatment recommendation data according to the selected diagnostic characteristic data, for example, target drug application data, and according to drug proportion data included in each target drug data, to calculate recommended drug values and drug safety days of each target drug data. However, in some embodiments, the processing unit 130 judges that the drug safety days is less than the harvest time data through the target drug data presented by the display unit 150.

In other embodiments, the user can use the operation interface 140 to input symptom characteristic data, to assist the disease analysis operation of the processing unit 130.

Figure 4A:
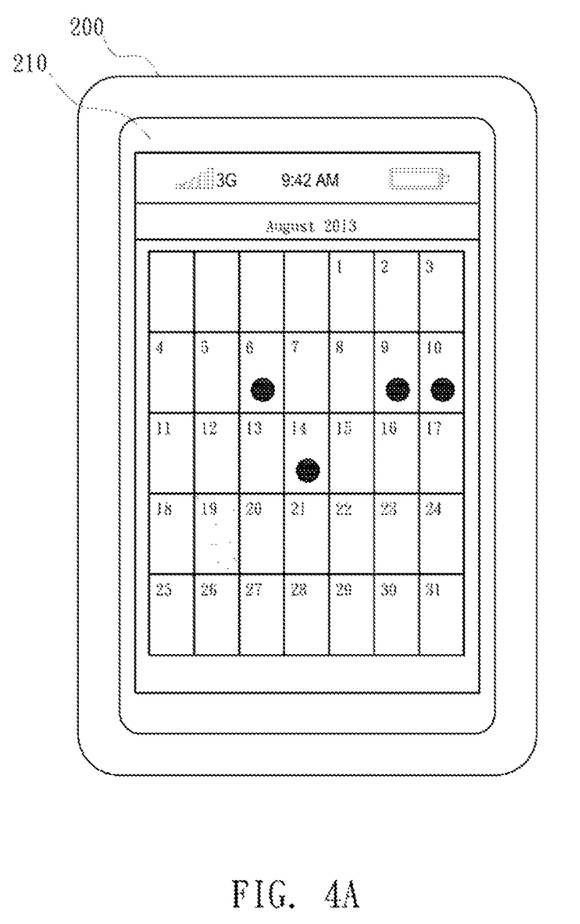
FIG. 4A and FIG. 4B illustrate diagrams of scheduling treatment recommendation data according to an embodiment of the present invention.
Figure 4B:
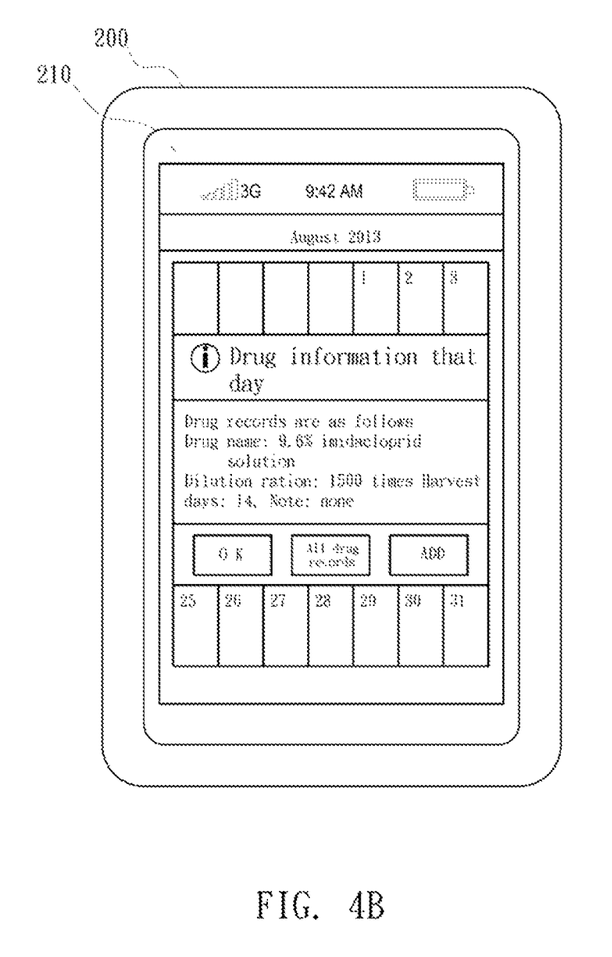

FIG. 4A and FIG. 4B illustrate diagrams of scheduling of treatment recommendation data according to an embodiment of the present invention. Herein, a touch electronic device 200 is served as an example for presenting and calculating recommendation data like target drug data, a recommended drug value and drug safety days.

A touch screen 210 provides the functions of the display unit 150 and the operation interface 140, and the processing unit 130 and the storage unit 110 may be disposed in the touch electronic device 200, or disposed in a remote connecting computing device. After the user uses the operation interface 140 to select required target drug data, the processing unit 130 may make out drug date data according to harvest time data of the plant. For example, for the drug date data shown in FIG. 4A, the harvest date is 19 August, the start date is 6 August, and the processing unit 130 calculates that the drug should be used 4 times, and the drug dates are 6 August, 9 August, 10 August and 14 August. When the user selects any one of the drug dates, it may present or remind the drug data corresponding to the drug date, for the user to query or make reference to.

The above merely describes embodiments of technical measures employed by the present invention for solving the problem, but is not to limit the scope of implementation of the present invention. Equivalent variations and modifications consistent with the literal meaning of the claims of the present invention or made according to the scope of the present invention should fall within the scope of the present invention.

What is claimed is:

1. A treatment recommending system of plant symptom, which is applicable to an electronic device, comprising:
   an operation interface, used for inputting symptom description data, wherein the symptom description data includes at least one text and graphical description of a part of a plant;
   a storage unit, used for storing at least one plant symptom data and at least one diagnostic data, wherein each plant symptom data comprises symptom characteristic data and display contour data corresponding thereto, and each diagnostic data comprises diagnostic characteristic data and treatment recommendation data corresponding thereto;
   a processing unit, electrically connected to a display unit, the operation interface and the storage unit, and used for matching the inputted symptom description data and the symptom characteristic data to obtain at least one of the display contour data corresponding to the symptom description data, and presenting the display contour data on the display unit; and an image capture unit, obtaining plant image data corresponding to a target contour data, when one of the display contour data is selected to be the target contour data, wherein the target contour data includes an outer contour image of a part of a plant, wherein the processing unit further receives and analyzes the plant image data to generate plant analysis data, and determines corresponding treatment recommendation data according to the plant analysis data and the diagnostic characteristic data, and presents the corresponding treatment recommendation data on the display unit; and wherein the processing unit analyzes the plant image data according to a first chromatism process to obtain plant part image data, analyzes the plant part image data according to a second chromatism process to obtain at least one symptom region image data, generates the plant analysis data from the symptom region image data, compares the plant analysis data with the diagnostic characteristic data in the storage unit, and when judging that the plant analysis data is consistent with particular diagnostic characteristic data, taking particular treatment recommendation data corresponding to the particular diagnostic characteristic data as the treatment recommendation data; and wherein the processing unit analyzes the plant image data according to the second chromatism process to obtain at least one suspected disease region image data, calculates a regional area of each suspected disease region image data, and takes the suspected disease region image data as the symptom region image data when the area of the suspected disease region is greater than a preset regional area.

2. The treatment recommending system of plant symptom according to claim 1, wherein the treatment recommendation data is target drug data, and a recommended drug value and drug safety days corresponding to the at least one target drug data.

3. The treatment recommending system of plant symptom according to claim 1, wherein the treatment recommendation data is a specified test data for a plant specimen.

4. The treatment recommending system of plant symptom according to claim 1, wherein the treatment recommendation data is disease prevention data.

5. The treatment recommending system of plant symptom according to claim 1, wherein the image capture unit connects to the processing unit via a communication network or a serial port.

6. The treatment recommending system of plant symptom according to claim 1, wherein, after obtaining the plant part image data, the processing unit removes noise of the plant part image data, and analyzes the plant part image data whose noise has been removed according to the second chromatism process to obtain the at least one symptom region image data.

7. The treatment recommending system of plant symptom according to claim 1, wherein the first chromatism process converts RGB data of the plant image data into chromatism data, and according to plant image chromatism interval data, removes a portion from the plant image data whose chromatism data is consistent with the plant image chromatism interval data to serve as the plant part image data.

8. A treatment recommending method of plant symptom, which is applicable to a treatment recommending system, comprising:

providing a storage unit for storing at least one plant symptom data and at least one diagnostic data, wherein each plant symptom data comprises symptom characteristic data and display contour data corresponding thereto, and each diagnostic data comprises diagnostic characteristic data and treatment recommendation data corresponding thereto;

receiving symptom description data via an operation interface, wherein the symptom description data includes at least one text and graphical description of a part of a plant;

matching the symptom description data received and the symptom characteristic data via a processing unit to obtain at least one of the display contour data corresponding to the symptom description data, and presenting the display contour data on a display unit;

obtaining plant image data corresponding to a target contour data via an image capture unit, when one of the display contour data is selected to be the target contour data, wherein the target contour data includes an outer contour image of a part of a plant; and analyzing the plant image data via the processing unit to generate plant analysis data, and determining corresponding treatment recommendation data according to the plant analysis data and the diagnostic characteristic data, and presenting the corresponding treatment recommendation data on the display unit; and wherein the processing unit analyzes the plant image data according to a first chromatism process to obtain plant part image data, analyzes the plant part image data according to a second chromatism process to obtain at least one symptom region image data, generates the plant analysis data from the symptom region image data, compares the plant analysis data with the diagnostic characteristic data in the storage unit, and when judging that the plant analysis data is consistent with particular diagnostic characteristic data, taking particular treatment recommendation data corresponding to the particular diagnostic characteristic data as the treatment recommendation data; and wherein the processing unit analyzes the plant image data according to the second chromatism process to obtain at least one suspected disease region image data, calculates a regional area of each suspected disease region image data, and takes the suspected disease region image data as the symptom region image data when the area of the suspected disease region is greater than a preset regional area.

9. The treatment recommending method of plant symptom according to claim 8, wherein the treatment recommendation data is target drug data and a recommended drug value and drug safety days corresponding to the at least one target drug data.

10. The treatment recommending method of plant symptom according to claim 8, wherein the treatment recommendation data is a specified test data for a plant specimen.

11. The treatment recommending method of plant symptom according to claim 8, wherein the treatment recommendation data is disease prevention data.

12. The treatment recommending method of plant symptom according to claim 8, wherein, in the step of analyzing the plant image data via the processing unit to generate plant analysis data, and determining corresponding treatment recommendation data according to the plant analysis data and the diagnostic characteristic data: the processing unit analyzes the plant image data according to a first chromatism process to obtain plant part image data, analyzes the plant part image data according to a second chromatism process to obtain at least one symptom region image data, generates the plant analysis data from the symptom region image data, compares the plant analysis data with the diagnostic characteristic data in the storage unit, and when judging that the plant analysis data is consistent with particular diagnostic characteristic data, taking particular treatment recommendation data corresponding to the particular diagnostic characteristic data as the treatment recommendation data.

13. The treatment recommending method of plant symptom according to claim 12, wherein the processing unit analyzes the plant image data according to the second chromatism process to obtain at least one suspected disease region image data, calculates a regional area of each suspected disease region image data, and takes the suspected disease region image data as the symptom region image data when the area of the suspected disease region is greater than a preset regional area.

14. The treatment recommending method of plant symptom according to claim 12, wherein, after the processing unit obtains the plant part image data, the processing unit removes noise of the plant part image data, and analyzes the plant part image data whose noise has been removed according to the second chromatism process to obtain the at least one symptom region image data.

15. The treatment recommending method of plant symptom according to claim 12, wherein the first chromatism process converts RGB data of the plant image data into chromatism data, and according to plant image chromatism interval data to remove a portion from the plant image data whose chromatism data is consistent with the plant image chromatism interval data to serve as the plant part image data.

16. A non-transitory computer-readable medium for executing a treatment recommending method of plant symptom, wherein the treatment recommending method of plant symptom comprises:

providing a storage unit for storing at least one plant symptom data and at least one diagnostic data, wherein each plant symptom data comprises symptom characteristic data and display contour data corresponding thereto, and each diagnostic data comprises diagnostic characteristic data and treatment recommendation data corresponding thereto;

receiving symptom description data via an operation interface, wherein the symptom description data includes at least one text and graphical description of a part of a plant;

matching the symptom description data received and the symptom characteristic data via a processing unit to obtain at least one of the display contour data corresponding to the symptom description data, and presenting the display contour data on a display unit;

obtaining plant image data corresponding to a target contour data via an image capture unit, when one of the display contour data is selected to be the target contour data, wherein the target contour data includes an outer contour image of a part of a plant; and analyzing the plant image data via the processing unit to generate plant analysis data, and determining corresponding treatment recommendation data according to the plant analysis data and the diagnostic characteristic data, and presenting the corresponding treatment recommendation data on the display unit.

* * * * *